United States Patent [19]

Tigner et al.

[11] 3,818,769
[45] June 25, 1974

[54] APPARATUS FOR REPEATED TRACING VARIOUS PATTERNS

[75] Inventors: Ruben A. Tigner, Bay City; Lewis S. Mounts, Midland, both of Mich.

[73] Assignee: The Dow Chemical Company, Midland, Mich.

[22] Filed: Oct. 30, 1972

[21] Appl. No.: 302,234

Related U.S. Application Data

[63] Continuation of Ser. No. 873,494, Nov. 3, 1969, abandoned.

[52] U.S. Cl. ............... 74/55, 33/18 B, 214/1 BB
[51] Int. Cl. ............................................ F16h 25/08
[58] Field of Search ............. 74/53, 54, 55; 33/18 B; 214/1 BB

[56] References Cited
UNITED STATES PATENTS

| | | | |
|---|---|---|---|
| 489,073 | 1/1893 | Edwards | 74/54 |
| 1,275,316 | 8/1918 | Springer | 74/53 |
| 1,597,474 | 8/1926 | Nordwick et al. | 74/53 |
| 1,604,625 | 10/1926 | Wickersham | 74/53 |
| 3,148,452 | 9/1964 | Von Rabenau | 33/18 B |
| 3,264,889 | 8/1966 | Machida et al. | 74/110 |
| 3,397,799 | 8/1968 | Wallia | 214/1 BB |
| 3,421,637 | 1/1969 | Sofy | 214/1 BB |
| 3,529,480 | 9/1970 | Kaspareck | 74/55 |
| 3,703,834 | 11/1972 | Beezer | 74/57 |

Primary Examiner—Samuel Scott
Assistant Examiner—Wesley S. Ratliff, Jr.
Attorney, Agent, or Firm—Burke M. Halldorson

[57] ABSTRACT

Apparatus capable of repeatedly tracing a programmed path at constant velocity, and useful for conveying glue applicator heads, cutting or welding tools or devices, and the like. Such apparatus can comprise, as an example, an X-Y table (see FIG. 4) including a platform 35 slidable on a first pair of rods 36 and 38 for reverse movement in the X direction, and a second pair of rods 60 and 62 slidably carried by platform 35 for reverse movement in the Y direction. A cam 76 is rotatably fixed to 76 35 and operates through cam followers to reversibly drive platform 35 and rods 60 and 62 such that a mounting shaft 72 fixed to the latter, moves with a direction and velocity comprising the vector sum of the movements of platform 35 and rods 60 and 62. Shaft 72, on whcih multiple glue applicator heads 26 or the like can be mounted, thereby repeatedly traces a certain path P dependent on the configuration of cam 76.

13 Claims, 12 Drawing Figures

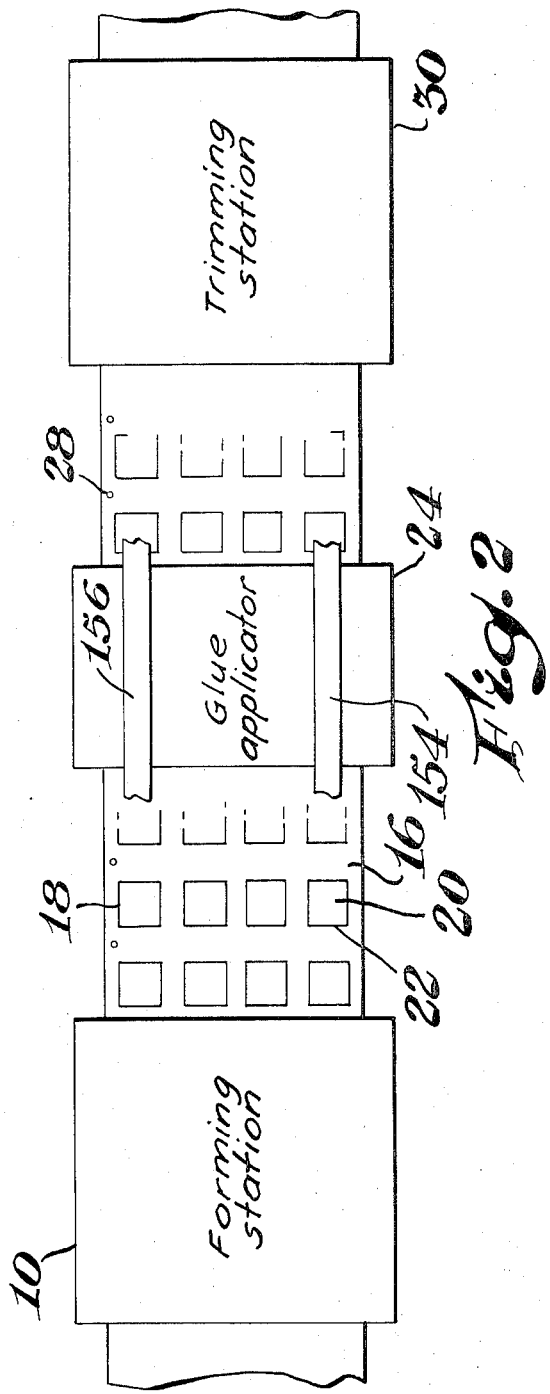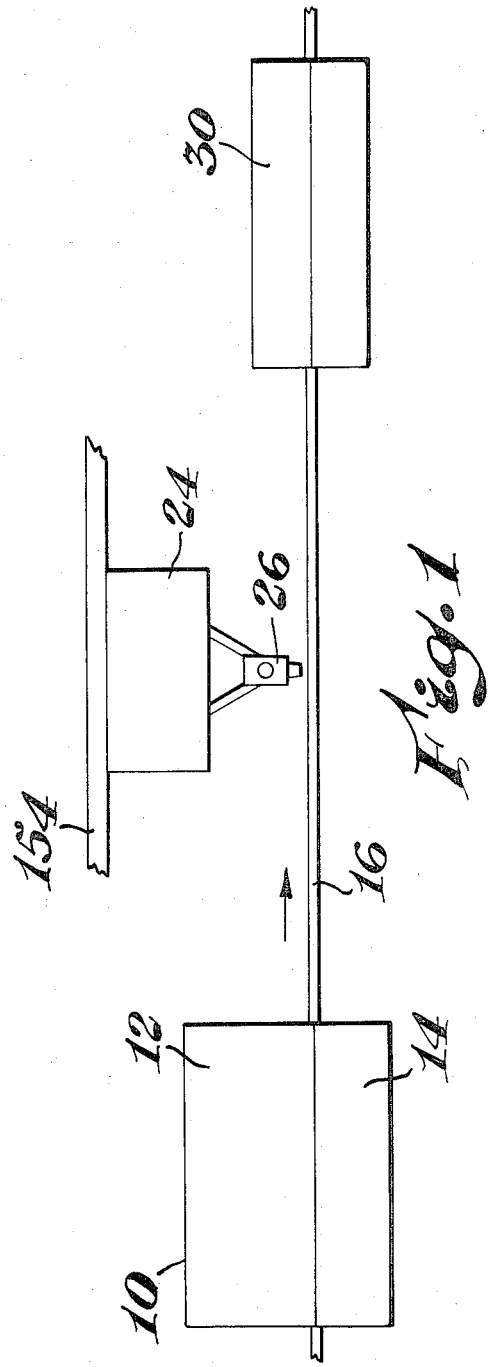

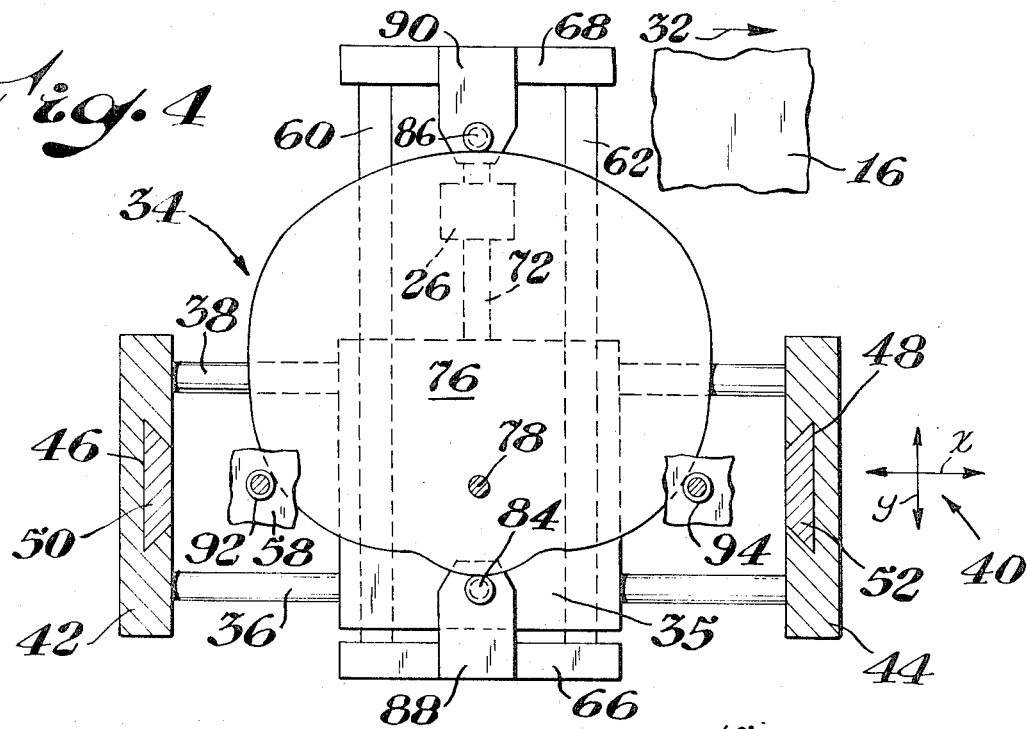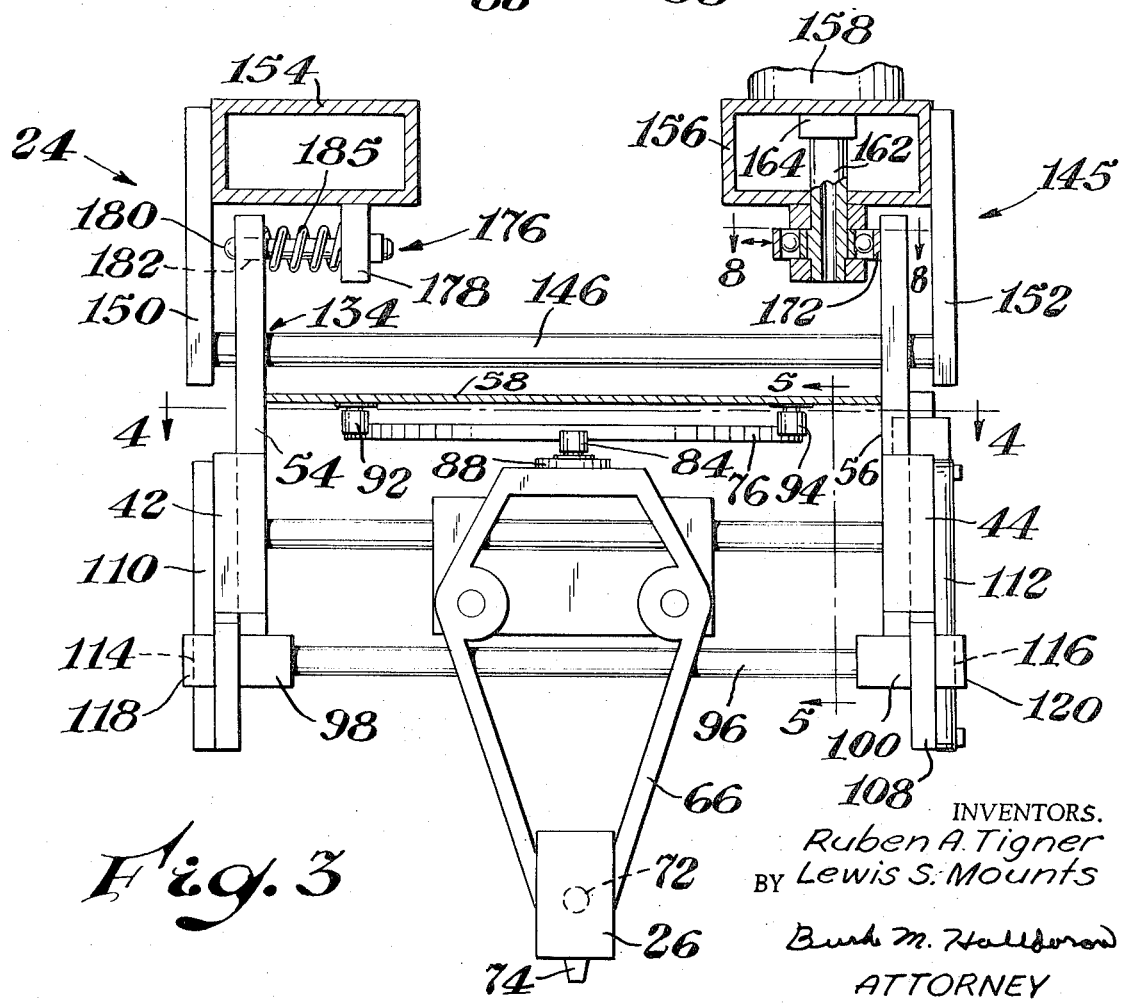

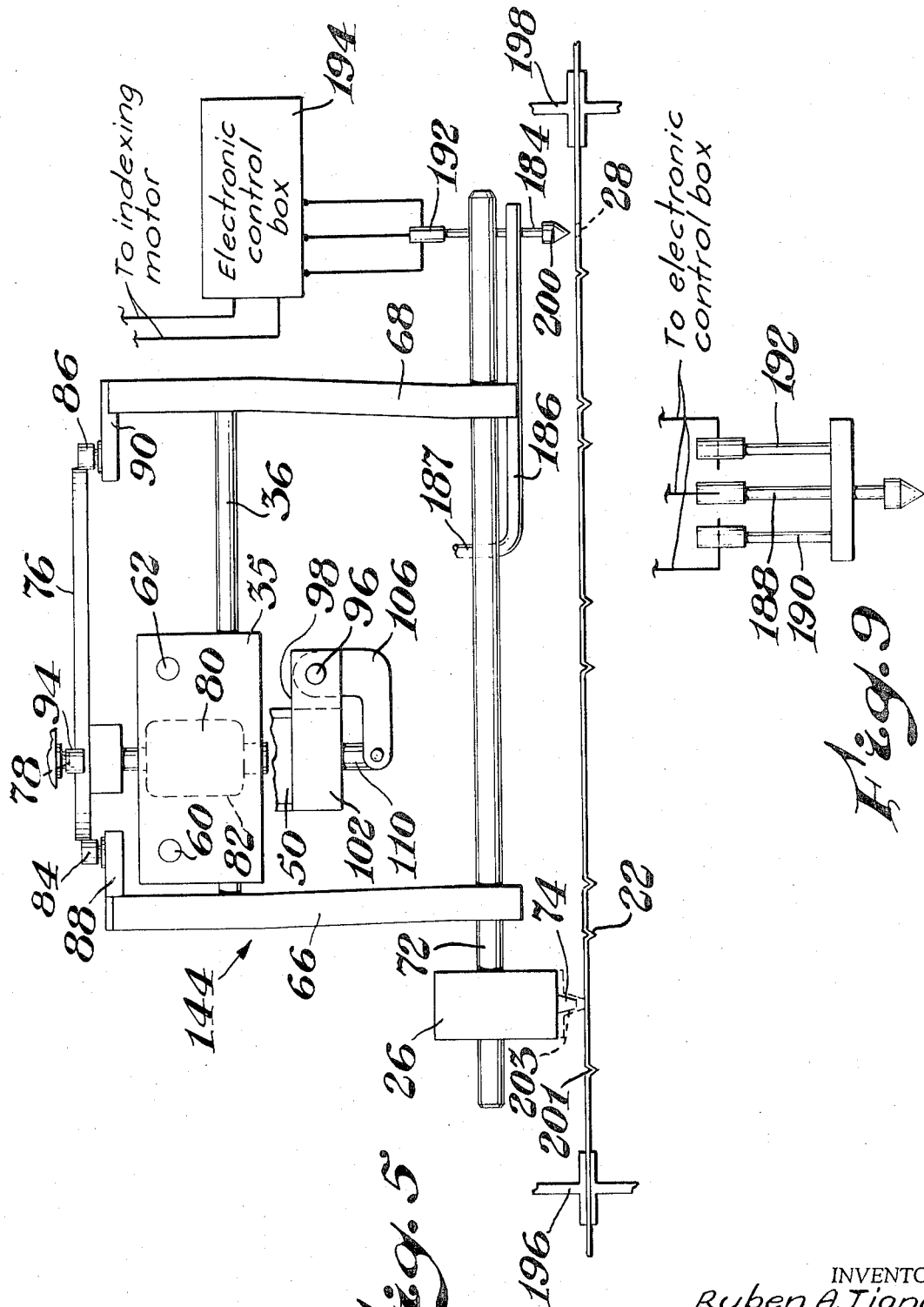

INVENTORS.
Ruben A. Tigner
BY Lewis S. Mounts

Burke M. Halldorson
ATTORNEY

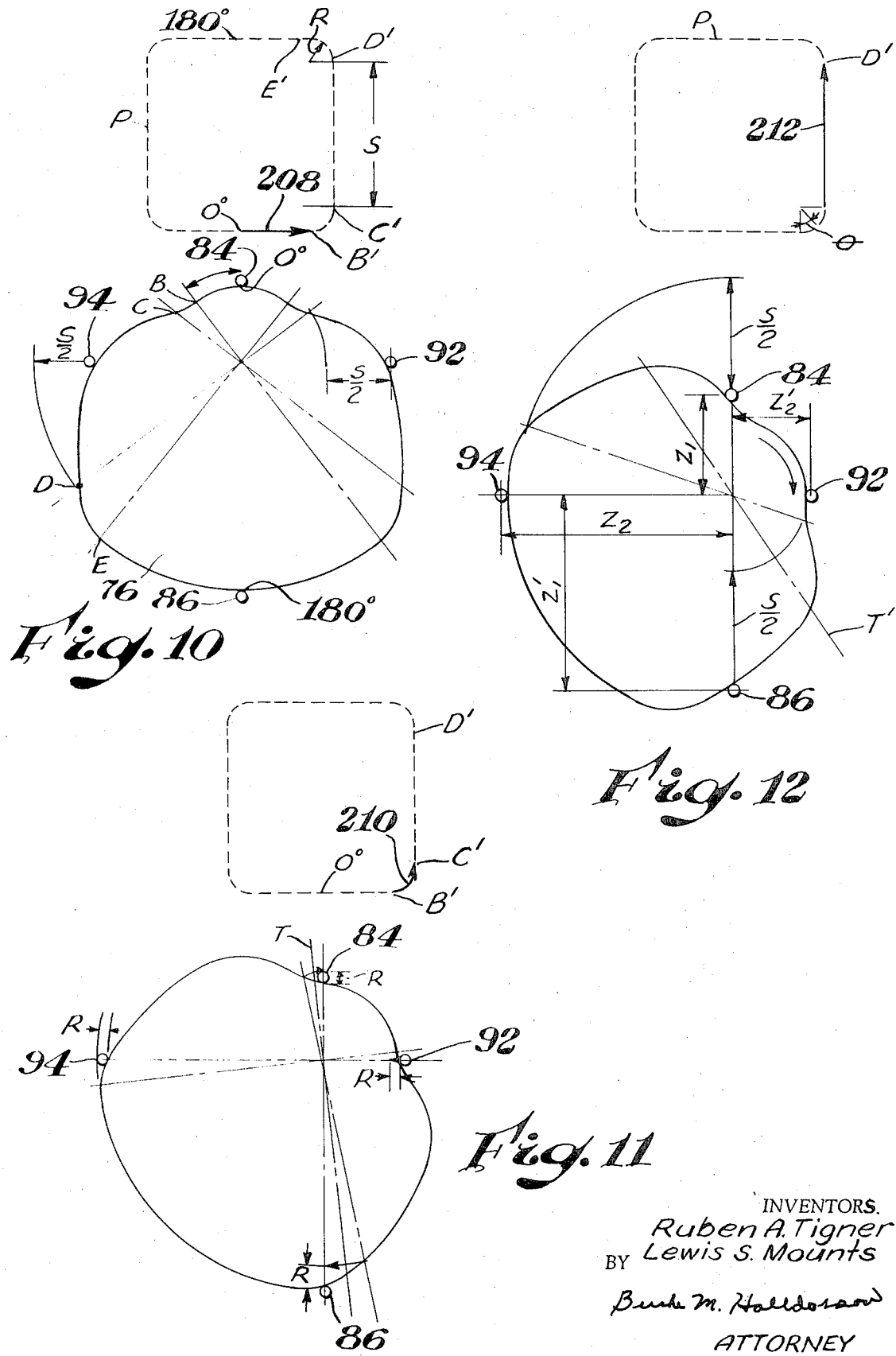

APPARATUS FOR REPEATED TRACING VARIOUS PATTERNS

This is a continuation, of application Ser. No. 873,494 filed Nov. 3, 1969 now abandoned.

BACKGROUND OF THE INVENTION

1. Field of the Invention

The present invention relates to apparatus adapted for repeatedly following a programmed path at constant velocity, and despite high accelerations and decelerations in the X and Y directions, respectively. More specifically, it relates to such an apparatus having combination uses such as a programmed glue applicator, cutting or welding assembly, etc., wherein it is required that a certain predetermined path be repeatedly and accurately duplicated at high speed to assist in parts fabrication or manufacture on a mass production basis.

2. Discussion of the Prior Art

In certain fabricating or manufacturing operations, it is necessary that various follower or tracer apparatus be provided that can repeatedly follow or duplicate a certain programmed path, with precise accuracy, and at rapid velocities. For example, in the manufacture of fittable or matable package components, oftentimes one of the components is grooved, and sealing adhesive or glue pre-applied to the grooved region of the component. Application of such adhesive can involve, for example, use of a programmed glue applicator or like suitable machinery that repeatedly traces the groove configuration while depositing a bead of sealing adhesive in the same. Oftentimes the sealing adhesive is a variety of "tack" adhesive such as to provide for repeated opening and resealing of the finished package. Such packages, for example, can be of a type as exemplified in U.S. Pat. No. 3,454,158. Cutting and welding fabrication would be other areas of utility as concerns programmed tracer of follower apparatus.

Development of a satisfactory programmed glue applicator, however, presents certain somewhat special problems. For example, the glue applying heads optimally must move at substantially constant velocity despite high accelerations and decelerations in the X and Y directions, respectively, such as at corner regions of the part. Such constant speed is necessary to insure the depositing of a substantially uniformly sized bead in the groove. Moreover, such an assemblage must precisely deliver the sealing adhesive to the grooved region of the part, preferably at a fast cycle, and optimally with the use of multiple heads connected, for example, in series so that adhesive is applied to multiple works units or parts with each cycle.

In the manufacture of certain lid components of the type set forth in the aforesaid U.S. Patent, as a specific example, it was desired to apply a uniform bead of sealing adhesive in a groove approximately 0.070 inch wide and ⅛ inch deep laid out in a pattern 4½ inches square having a ⅜ inch corner radii. The glue bead diameter would normally measure between about 0.020 inch to 0.030 inch. Such an operation is necessarily carried out employing multiple glue applying heads as it is required that the parts be fabricated in a minimum amount of time. Acceptable specifications for a suitable glue applicator assemblage would, in this instance, require the gluing operation to be performed in cycles of preferably less than 4 seconds with the applicator heads moving approximately at 20 inches per second constant linear velocity. Moreover, the tolerances in applying the glue would necessarily be quite precise since the package must hermetically seal in the grooved region.

To maintain such precise tolerances, the applicator assemblage or apparatus must overcome tendencies to "overshoot" or "overthrow" the glue mass such as at corner regions of the part. In this regard, the glue mass, because of its liquid quality, tends to move uncontrollably with changes in direction of the applicator heads, or in other words, to "overthrow" the groove at part corner regions, rather than follow the controlled turn of the applicator head at such regions. For example, at speeds of 20 inches per second, the X and Y vector velocities can vary from 0-20 inches per second along 90° turns of the applicator heads. At corner regions, therefore, "overthrow" tendencies, unless controlled, can cause movement of the adhesive mass to distances significantly greater than groove width.

In addition, "snap-back" or other uncontrolled sudden jerky movement of the applicator's heads must be minimized such as at termination of the stroke in a given direction, i.e., at turns or corner regions. In other words, an optimum glue applicator assemblage would provide for smooth, non-jerky movement of the applicator heads accompanying, for example, each acceleration and deceleration of the heads in the X and Y directions, respectively, such that the adhesive bead can be uniformly and controllably applied to the groove.

It is among the objects of the invention, therefore, to provide the following:

Apparatus capable of accurately and repeatedly duplicating a certain path at constant velocity, and with smooth, non-jerky movements along all regions of the path;

Such apparatus adapted to repeatedly trace various path configurations and/or sizes, and wherein each such change to a different path configuration and/or size can be efficiently accomplished by substituting drive cam mechanisms.

Such apparatus adapted to operate multiple heads such that multiple product units can be worked with each cycle;

Such apparatus having substantially zero "play" between its various working parts whereby the same operates with precise accuracy;

Such apparatus having various and numerous uses such as use a programmed glue applicator, or as programmed welding or cutting assemblies and the like; and An improved programmed glue applicator capable of accurately and uniformly depositing a bead of adhesive, glue, hot melt, or the like in a groove region of a part at rapid cycles and which needs only minimal power requirements to operate.

BRIEF SUMMARY OF THE INVENTION

Briefly then, the improved apparatus of the present invention comprises, for example, a novel cam operated X-Y table assemblage including a follower or head assembly movably operated at constant speed, and adapted to repeatedly duplicate a certain programmed path dependent on cam profile configuration. Such an X-Y table, as an example, can consist of a platform slidably movable in the X direction on a first pair of rods, and further includes a second pair of rods slidably carried by the platform for reversible movement in the Y direction. The cam can be rotatably fixed to the platform and through engagement with cam followers reversibly moves the platform and second pair of rods in the X and Y directions, respectively. The head assembly, by connection to the latter, thereby moves with a direction and velocity comprising the vector sum of the X and Y movements of the platform and the second pair of rods. Such an apparatus can be adapted to raise and lower vertically, such as for gluing applications where, for example, maximum closeness between the glue applying nozzles and grooves effectively minimizes "overthrow" tendencies. The apparatus of the present invention can also be made self indexing with regard to groove or work part placement. Moreover, as will be explained more fully hereinafter, such apparatus is capable of operating smoothly, at rapid cycles, with precise accuracy, and needs only minimal power requirements to operate.

The preferred embodiments of the present invention are shown in the accompanying drawings wherein wheresoever possible, like reference numerals designate corresponding materials and parts throughout the several views thereof in which:

FIGS. 1 and 2 are side and top views, respectively, illustrating apparatus for forming and trimming of package parts from flat sheet material, such apparatus including "in-line" a programmed glue applicator for depositing adhesive in a grooved region of the parts, the glue applicator being constructed according to the principles of the present invention;

FIG. 3 is a side view including portions cross-sectioned, illustrating in more detail the construction of the programmed glue applicator of FIGS. 1 and 2;

FIG. 4 is a top view showing the programmed glue applicator of FIG. 3 and illustrates generally separately the cam operated X-Y table assembly portion thereof;

FIG. 5 is a cross sectional view of the programmed glue applicator of FIG. 3, with parts broken away, and taken along reference line 5—5 thereof, and additionally shows a sensing probe mechanism for precisely determining package part position;

Figure 6:
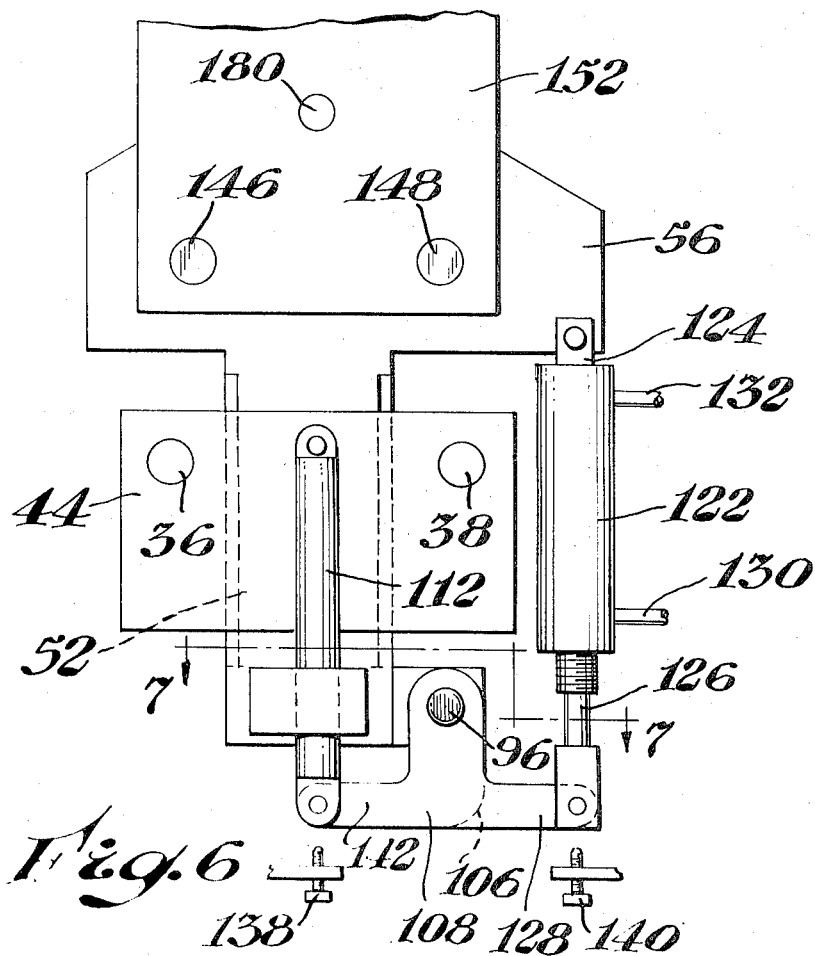
FIG. 6 is an end view of the programmed glue applicator of FIG. 3 taken along reference line 6—6 thereof.
Figure 8:
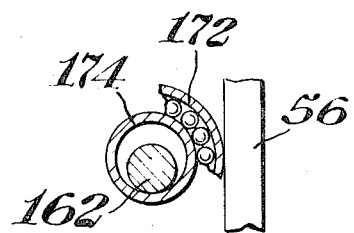
Figure 7:
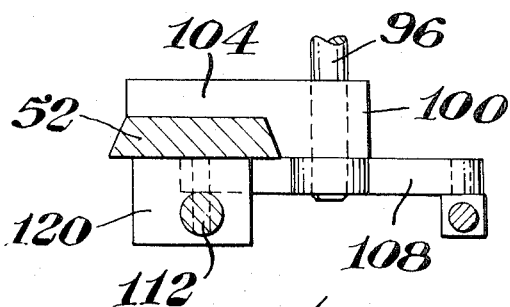

FIGS. 7 and 8 are cross sectional views taken along reference lines 7—7 and 8—8 of FIGS. 6 and 3, respectively;

FIG. 9 is a side view of the sensing probe mechanism illustrated in FIG. 5, and is taken along reference line 9—9 of FIG. 5; and FIGS. 10–12 illustrate at various progressive stages, rotation of the cam drive portion of the X-Y table assembly of FIG. 4, the cam being viewed upside down from its orientation shown in FIG. 4 to assist description, and additionally shows imaginary paths denoting corresponding movement of the glue applying heads responsive to such cam rotation.

Referring now more particularly to the drawings, there is shown in FIGS. 1 and 2, thermoforming apparatus 10 of a type basically comprising movable halves 12 and 14 which receive between them flat sheet stock 16 from a source such as a feed role assembly (not shown). Halves 12 and 14 operate to form sheet 16 into a plurality of connected parts such as lid parts 18 situated four across, and each including a flat central region 20 surrounded by a peripherally continuous groove 22. Simultaneously with forming, indexing holes 28 can be punched in sheet 16 for purposes as will be indicated hereinafter.

Sheet 16 after forming is indexed forward and clamped in place beneath a glue applying station or programmed glue applicator 24 including multiple glue applicator heads 26, only one being shown (see FIG. 5). Heads 26 are adapted to move or drop to a position as indicated in dotted lines, and to follow the path of grooves 22, respectively, such that sealing adhesive or glue issuing from the heads is deposited uniformly in the grooves. Lid parts 18 are then forwarded to a suitable trimming station or press 30 where the same are separated from the sheet for subsequent placement in shippers or storage cartons, for example.

Referring now to FIGS. 3–6, glue applicator 24 is shown in more detail, sheet 16 being positioned beneath applicator 24 with its direction of forward indexed movement being denoted by arrow 32. Applicator 24 comprises in part a programmed X-Y table assembly 34 as is shown separately at FIG. 4, and which is adapted to move nozzle heads 26 about the path of grooves 22, at constant velocity, and in a manner to be described.

Table assembly 34 includes a platform or table portion 35 slidably received on a first pair of rods or parallel X rods 36 and 38 such that the platform is reversibly movable in the X direction, such direction being arbitrarily assigned according to the legend denoted at 40. X rods 36 and 38, in turn, fixedly connect at their ends to rectangular parts 42 and 44, respectively, the latter which include inwardly facing dovetail grooves 46 and 48, respectively. Grooves 46 and 48 are slidably fitted to the lower dovetailed ends 50 and 52 of a pair of upright, T-shaped members 54 and 56, respectively, whereby assembly 34 is adapted to be slidably raised and lowered on members 54 and 56, as will be explained more fully hereinafter (see FIG. 6). A flat horizontally disposed plate 58 is fixedly connected between T-shaped members 54 and 56 at a region above dovetailed ends 50 and 52.

Additionally, assembly 34 includes a second pair of rods or parallel Y rods 60 and 62 disposed normal to X rods 36 and 38, and slidably carried by platform 35 such as to be reversibly movable in the Y direction. Hollow cross pieces 66 and 68 extend above and below platform 35 (see FIGS. 3 and 5) and at their midregion fixedly connect between the adjacent ends, respectively, of Y rods 60 and 62. A mounting bar or shaft 72, disposed beneath Y rods 60 and 62, and in parallel alignment with the same, is fixedly connected at its opposite ends to cross pieces 66 and 68, respectively, as is best shown in FIG. 5. Mounted in spaced series on bar 72 are the four nozzle heads 26 such that their nozzle portions 74, respectively, are positioned in close proximity to formed sheet 16.

A drive cam 76 is disposed directly above platform 35, and is rotatably fixed to the same at axis or bearing point 78. Cam 76 is operated by a drive source or motor 80 inserted vertically in a cavity 82 defined in platform 35 (see FIG. 5).

A first set of cam followers or Y cam followers 84 and 86 are located along the Y axis through bearing point 78, so as to engage cam 76 from opposite sides. Y cam followers 84 and 86 are mounted at a fixed distance from each other such as by means of fixed attachment to a pair of support arms 88 and 90, respectively, which, in turn, bolt or otherwise fixedly connect to the top side of cross pieces 66 and 68, respectively. A second pair of cam followers or X cam followers 92 and 94 engage cam 76 from opposite sides along the X axis through bearing point 78, and are mounted at a fixed distance from each other such as by fixed attachment to the underside of plate 58.

RAISING AND LOWERING MECHANISM

Referring more specifically to FIGS. 3, 5 and 6, located beneath rectangular parts 42 and 44, and offset to the side of dovetail ends 50 and 52, is an X-direction oriented shaft or bar 96. Shaft 96 is turnably carried adjacent its opposite ends by collar pieces 98 and 100, respectively, the latter including rigid offset extensions 102 and 104. Collar pieces 98 and 100, at extension 102 and 104, in turn, fixedly attach to the inner face of dovetailed ends 50 and 52, respectively. Fixedly keyed to shaft 96, outwardly of collars 98 and 100, respectively, is a first or L-shaped lever 106 located adjacent collar 98, and a second or inverted T-shaped lever 108 located adjacent collar 100. Levers 106 and 108 operate vertically disposed lever arms 110 and 112, respectively, which, in turn, pivotally connect at their ends opposite levers 106 and 108, to the exterior face of rectangular parts 42 and 44, respectively. Lever arms 110 and 112 midway between parts 42 and 44 and levers 106 and 108, are vertically movable through bores 114 and 116, respectively, defined in rectangular stop blocks 118 and 120, respectively. Stop blocks 118 and 120, in turn, are fixedly secured to the outer face of dovetailed ends 50 and 52, respectively, at a region opposite offset extensions 102 and 104 (see FIG. 7).

A vertically disposed two-way air cylinder 122 is connected at its top end 124 to T-shaped piece 56, and its bottom end or drive end 126, to forward arm 128 to lever 108. Air hoses 130 and 132 feed and exhaust compressed air to and from upper and lower cylinder parts of air cylinder 122 such that its stroke in either direction is a power stroke rockably moving lever 108, and through shaft 96, lever 106. Movement of the levers is controllably governed such as by fixedly mounted set screw assemblies 138 and 140 disposed underneath lever 108 adjacent its forward and rearward arms 128 and 142, respectively (see FIG. 6).

INDEXING ASSEMBLAGE

The assemblage of parts heretofore disclosed, and hereinafter collectively referred to as the lower assemblage 144, is reversibly movable on an indexing or upper assemblage 145 including a pair of parallel indexing slide rods 146 and 148 oriented in the X direction. Specifically, T-shaped members 54 and 56 of lower assemblage 144 are bored to be slidably carried on indexing rods 146 and 148, whereby the lower assemblage can be reversibly moved in the X direction or, in other words, in the machine direction, on indexing rods 146 and 148.

End regions 134 and 136 of indexing rods 146 and 148 are extended through T-shaped pieces 54 and 56, respectively, and at a spaced distance from the outer face of the latter, are rigidly affixed to vertically disposed plates 150 and 152, respectively. Plates 150 and 152, in turn, fixedly connect to hollow rectangular frame members 154 and 156, respectively, frame members 154 and 156 comprising portions of an appropriate support, stand assembly, or the like (not shown) rigidly mounting glue applicator 24 above sheet 16 as indicated.

An indexing drive motor 158 is mounted at the top side of frame member 156, and its drive shaft (not shown) fixedly keyed to a hollow extended shaft member 162 such as by steel set collar 164. Shaft 162 extends through frame member 156 and at the underside thereof is rotatably guided by collars 166 and 168 mounted to the underside of member 158, but at a spaced distance from each other. Fitted between collars 166 and 168 is a ball bearing assembly 170 whose outer ring 172 engages T-shaped member 56. Bearing assembly 170 is operated to move slidably between collars 166 and 168 as indicated by arrows 175, by an indexing cam 174. Cam 174, in turn, is rotatably operated by extension shaft 162 such as through fixed attachment therewith, as is best shown in FIG. 8.

Resiliently pressing T-shaped piece 56 against outer ring 172 is a spring loading assembly 176 including in part a rigid vertical support arm 178 mounted to the underside of frame member 154. Extension arm 178, in turn, fixedly mounts a horizontally disposed slide bar 180, the latter being slidably received opposite arm 178, in a bore 182 defined in T-shaped member 54. A spring 185, in compression between T-shaped member 54 and arm 178, is carried about the mid-region of a slide bar 180, whereby movement of lower assembly 144 on indexing bars 146 and 148 is against or with the compressive force of spring 185.

Referring now to FIG. 5, located beneath glue applicator 24 is a vertically positioned sensing probe 184 pivotally held at its mid-region by an elbow-shaped member 186, the latter being extended upwardly at one end 187 such as to permit its fixed connection to the underside of rectangular piece 44 (not shown). The upper end 188 of probe 184 is disposed between first and second electrical contact means 190 and 192, respectively, (see FIG. 9). Contact means 190 and 192 are wired to an electronic control box 194, which, in turn, operates index motor 158 to turn indexing cam 174.

OPERATION

In operation sheet 16 is indexed forward after forming, and firmly clamped in place beneath glue applicator 24 such by clamping assemblies 196 and 198, respectively, as is denoted schematically in FIG. 5. Compressed air is then delivered into the lower cylinder of air cylinder 122, and exhausted from its upper cylinder such as to move drive arm 126 upwardly. Drive arm 126, in turn, rockably moves lever 108, and through shaft 96 lever 106, whereby lever arms 110 and 112 move downwardly to cooperatively lower X-Y table assembly 34 on dovetail ends 50 and 52, and to the position denoted at 203 by dotted lines in FIG. 5. Nozzle portions 74 are thereby moved closer to sheet 16, and preferably into the hollows 201 defined by grooves 22. For flat sheet 16 materials, normally appropriate downward and upward movement of X-Y table assembly 34 is in the range of approximately one-eleventh inch to three-eighths inch, as can be adjusted at set screw assemblies 138 and 140. Simultaneously with the lowering of assembly 34, pointed end 200 of probe 184 engages the appropriate indexing hole 30 of sheet 16. If centering is perfect, or in other words, if sheet 16 is precisely indexed beneath applicator 24, probe 184 perfectly centers in indexing hole 30 such that its upper end 188 remains essentially vertical and in spaced relationship between contact means 190 and 192. If conversely, however, indexing is slightly off, probe 184 centers itself in indexing hole 30 by pivotal movement in arm 186 such that its upper end 188 moves to engage either contact means 190 or 192, thereby operating electronic control box 194. Electronic control box 194, in turn, operates indexing motor 158 so as to rotate indexing cam 174 appropriately either clockwise, to move lower assembly 144 forward in the machine direction, or counterclockwise to cause backward movement (see FIG. 8) thereby properly positioning nozzles 74 in grooves 22. Such movement simultaneously pivotally moves probe 184 to its vertical or rest position, thereby disengaging indexing motors 158 at the proper moment.

The movement of cam 76 can be on a continuous or intermittant basis, the former being preferred for gluing applications. Thus, subsequent to or accompanying the lowering of nozzle portions 74 into grooves 22, motor 80 is operated to rotate cam 76 clockwise as is denoted by arrow 206 in FIG. 4. Cam 76 operates through the indicated cam followers to reversibly move platform 35 and Y rods 60 and 62 in the X and Y directions, respectively. Applicator heads 26, fixedly attached to Y rods 60 and 62 via shaft 96, therefore, move with a direction and velocity comprising the vector sum of the movements of platform 35 and Y rods 60 and 62.

A more detailed illustration of the operation of cam 76 is shown in FIGS. 10–12 where the rotation of the cam is denoted at progressive stages. In each of these latter views, an imaginary square pattern P (of side dimensions S, and corner radii R) is illustrated to represent the square configuration of grooves 22. The parts of pattern P in solid lines and terminating in arrowheads, denote the movement of nozzle portions 74 responsive to cam 76 rotation.

Thus, from FIG. 10, initial cam rotation from point 0° to point B, i.e., from point 90° to point D at X-cam follower 94, forces cam 76 to "push off" X-cam follower 94, thereby moving or "pushing" platform 35 to the right a distance of S/2. The distance of X movement is the difference between the center of cam 76 and the center of cam follower 94 at points 90° and D, respectively. Corresponding movement in the Y direction is zero since in rotating from point 0° to point B, Y-cam followers 84 and 86 engage constant cam 76 radii Cr and CR, respectively. The vector sum of the movement, i.e., the movement applicator heads 26, is therefore S/2 in the X direction, as is denoted by solid line 208 extending from point 0°' to point B' on pattern P. Such movement of the applicator heads 26, it will be observed, is from left to right or reverse to the clockwise rotation of cam 76. In other words, the "pushing-off" action of cam 76 on X-cam follower 94 causes the platform 35 to move in a direction opposite or reverse to cam movement.

Referring now to FIG. 11, rotation of cam 76 from point B to point C pushes Y-cam followers 84 a distance of R, thereby forcibly moving Y rods 60 and 62 a like distance R in the same direction. Such rotation, at the same instant, moves cam 76 from point D to point E at X-cam follower 94, thereby pushing platform 35 further to the right an additional distance R. The vector movement is, accordingly, a distance $\pi R/2$ along an arc extending from point B' to point C' on pattern P, as is denoted by solid line 210.

Referring now to FIG. 12, cam 76 rotation from point C to point D forcibly moves Y rods 60 and 62 an additional amount S. At the same instant, X-cam followers 92 and 94 engage constant cam radii Cr and CR, respectively, resulting in zero movement in the X direction. Vector sum movement is, therefore, a distance S in the Y direction, as is denoted by solid line 212 extending from point C' to point D' on pattern P. Additional revolution of cam 76 from point E to point 0° completes the traverse of pattern P, whereby applicator heads 24 are moved to point 0° on pattern P.

Coincident with initial rotation of cam 76, applicator heads 26 are operated such that a bead of adhesive, issuing from nozzle portions 74 (not shown), is uniformly deposited in grooves 22, respectively. Since cam 76 rotates at a constant angular rate, conventional electrical timers are practical means for operating nozzle portions 74 at the proper intervals. Each "start-up" of the adhesive stream issuing from nozzles 74 is normally characterized by restrictive flow for approximately the first one-fourth or one-half inch of movement along the groove (depending on speed of travel) and thereafter the stream flows at full proportion. Shutoff of the stream by suitable valving means, in a like manner, normally first occasions diminishing flow for a distance of approximately one-fourth to one-half inch, and thereafter total ceasing of flow. By properly timing "start-up" and "shut-off," therefore, the one-fourth or one-half inch distance covered during the period of initial restrictive flow can be "re-covered" during the period of diminishing flow such that the amount of adhesive in all regions of grooves 28 is substantially uniform.

CAM DESIGN AND COMPUTATION

The movement of nozzle portion 74 about a predetermined or programmed path is dependent on cam 76 profile design. Thus, by substitution of cams of different profiles, paths of an infinite number of shapes and sizes can be traced, a few examples of these being rectangular, oval and like shaped patterns, plus the indicated square pattern P accomplished through the design of cam 76.

Regardless of pattern shape, however, cams constructed for usage in X-Y table assembly 34, are commonly mathematically defined by expression (A) and (B) below:

A. $Z_1 = r + Y$
B. $Z_2 = r + X$ where:

$Z_1$ = the distance from the center point of the cam to the center point of the Y cam follower at any specified angle A (See FIG. 12);

Y = the cumulative pattern movement in the Y direction responsive to cam rotation from 0° to angle A;

$Z_2$ = the distance from the center point of the cam to the center point of the X cam follower at any specified angle A (See FIG. 12);

X = the cumulative pattern movement in the X direction responsive to cam rotation from 0° to angle A; and r = a constant In the special case of a square pattern P, it is evident that $Z_1 = Z_2$. Therefore, either of the expressions A or B above is appropriate in calculating the profile or radii of cam 76 from 0° to 360°. In applications for tracing, for example, an oval or a non-square rectangular pattern, however, the cumulative movements in the X and Y directions are not equal and, therefore, $Z_1$ does not equal $Z_2$. Thus, a double face cam must be provided with its separate faces driving the X and Y cam followers, respectively. A double faced cam is appropriately designed utilizing expression A to construct the cam face driving the Y cam followers, and expression B to construct the face driving the X cam followers.

To obtain constant nozzle speed suitable cams for use with X-Y table assembly 34, are, in addition, conveniently designed utilizing, in addition the following parameters:

1. Cam velocity = a constant = $K$
2. One revolution of the cam = one traverse of the pattern; and
3. $dl$/degree of cam rotation = a constant = $K'$ where:

$dl$ = the movement of nozzle portions 74 on the pattern.

Applying the above parameters to cam 76 design, such a cam is constructed to trace a square pattern P as tabulated in Table I below where:

$S$ and $R$ = pattern side dimension and corner radii, respectively (See FIG. 10);
$L$ = total pattern length = $4S + 2\pi R$
$K' = L/360 = 4S + 2\pi R/360$
$Z_1 = r + Y$ 3,600 such measurements are taken at $1/10°$ increments progressively from a starting point of $0°$. Since such measurements represent the distance from the center point of the cam to the center point of the cam follower, the cut is made allowing for subtraction of one-half the diameter of the cam follower, as is customary in cam manufacture.

Cams constructed according to the present invention, are further commonly characterized by the following relationships as expressed mathematically:

$$Z_{1\angle A} + Z'_{1\angle A + 180°} = \text{Constant}_1 = a_1 + b_1$$

$$Z_{2\angle A + 90°} + Z'_{2\angle A' + 180° + 90°} = \text{Constant}_2 = c_1 + b_1$$

where:

$Z_1$ and $Z'_1$ = the distance between the cam center point and the Y cam followers, respectively;

$Z_2$ and $Z'_2$ = the distance between the cam center point and the X cam followers, respectively; and $\angle A$ = any specified angle on the cam from $0°$ to $360°$.

Again, for the special case of cam design for tracing a square pattern P, and referring to the mathematical expressions directly above, constant$_1$ = constant$_2$. In other words, the predetermined distance between the two X-cam followers and two Y-cam followers, respectively, will be equal. For non-square, rectangular, oval,

TABLE I

| Cam rotation | Cam angular values ( ) | Cam radius ($Z_1$) |
|---|---|---|
| $\angle 0°$ to $\angle B$ | Nozzles portions 74 move from point $0°$ to point $B'$. $Y$ movement $= 0$. $X$ movement $= S/2$. $\therefore \angle B = \dfrac{\text{Pattern movement}}{K'} = \dfrac{S/2}{K'} = \dfrac{360S}{2(4S + 2\pi R)}$ | $Y = 0$ $Z_1 = r =$ a constant (any convenient value) |
| $\angle B$ to $\angle C$ | Nozzles portions 74 move from $B'$ to $C'$. $X + Y$ movement $= \pi R/2$. $C = B + \dfrac{\pi R}{2K'} = 90° - 2B$ | $Y = R - R \cos \Theta$ $\Theta = \dfrac{(T-B)K'}{R}$ Where: $\angle T =$ cam rotation from $\angle B$ to $\angle C$ $\therefore Z_1 = r + R - R \cos \dfrac{(\angle T - \angle B)K'}{R}$ |
| $\angle C$ to $\angle D$ | Nozzles portions 74 move from point $C'$ to $D'$. $X$ movement $= 0$. $Y$ movement $= S$. $\therefore \angle D = \angle C + S/K' = \angle B + 90°$ | $Y = R + (\angle T' - \angle C) \times K'$ While: $\angle T' =$ Cam rotation from $\angle C$ to $\angle D$ $\therefore Z_1 = r + R + (\angle T' - \angle C) K'$ |
| $\angle D$ to $\angle E$ | Nozzles portions 74 move from point $D'$ to $E'$. $X + Y$ movement $= \pi R/2$. $\angle E = \angle D + \dfrac{R}{2K'} = \angle C + 90°$ | $Y = S + R + R \sin \dfrac{(\angle T'' - \angle D)K'}{R}$ Where: $T'' =$ cam rotation from $\angle D$ to $\angle E$ $\therefore Z_1 = r + R + R \sin \dfrac{(\angle T'' - \angle D)K'}{R}$ |
| $\angle E$ to $180°$ | | $Y = R + R + S$ $\therefore Z_1 = r + 2R + S$ |

The desired numerical values are then substituted for S and R in the equations of Table I above, and cam 76 profile calculated by conventional methods or by computer. Since cam 76 is symmetrical, it is only necessary to calculate its profile from $0°$ to $180°$. In the case of computer computations, after programming, the computer tape can be used on a conventional tape-controlled milling machine to manufacture cam 76.

The cam is manufactured, for example, from a sheet or plate of suitably thick metal (not shown) such as by fixing a rod to one side the sheet, thereby selecting an arbitrary cam center point or bearing point 78. Measurements are then made from the center point, and since accuracy is premium, normally approximately and like configured patterns, however, constant$_1$ and constant$_2$ will not be equal, and therefore the spacing between the X and Y cam followers, respectively, in such latter cases, will be different.

Referring now to more specific constructions of various parts of glue applicator 24, each cam follower can comprise, as for example, a cylindrical center post and a revolvable jacket about the center post, such that friction and wear between the profile of cam 76 and the followers is minimized.

Preferably, A step-down harmonic drive electric motor is used as the power source 80 operating cam 76. Such a motor has the advantage of substantially zero play and drives at speeds such that its shaft can be directly connected with cam 76, and without need for step-down gears or the like. One such motor comprises a 30 watt unit manufactured by the Harmonic Drive Division, United Shoe Machinery Corp., Beverly, Mass., under the designation Model HDUM-16-100-01, Ser. No. 9454. The motor has a ratio rating of 100. Such a motor can also be used to operate indexing cam 174.

While certain representative embodiments and details have been shown for the purpose of illustrating the invention, it will be apparent to those skilled in the art that various changes and modifications can be made therein without departing from the spirit and scope of the invention. For example, while the invention has been most particularly described as regards a programmed glue applicator, it is evident that the principles of the invention are also broadly applicable to such manufacturing activities, as for example, welding, cutting, part trimming, and the like.

What is claimed is:

1. Apparatus for repeatedly describing a certain path, and comprising a first rotatable cam means, a first pair of cam followers spaced a fixed distance apart and disposed on opposite sides of and in alignment with the center of revolution of said first cam means to define a first axis, said first cam means being cooperable with said first pair of cam followers for supplying positive reciprocal motion parallel said first axis responsive to rotation of said first cam means, a second rotatable cam means having its center of revolution common with that of said first cam means, a second pair of cam followers spaced a fixed distance apart and disposed on opposite sides of and in alignment with said center of revolution to define a second axis extending normal to said first axis, said second cam means being cooperable with said second pair of cam followers to supply positive reciprocal motion parallel said second axis responsive to rotation of said second cam means, means to rotate said first and second cam means at an essentially constant angular velocity, means to translate the reciprocal motions along said first and second axis into the vector sum thereof to describe said path, said first and second cam means and the cam followers associated therewith being described respectively by the equation:

$$Z_{\angle A} + Z'_{\angle A + 180°} = \text{a constant}$$

wherein:
$Z$ = the distance between the center of revolution of the first or second cam means, as applies, and the center of a cam follower associated therewith;
$Z'$ = the distance between the center of revolution of the first or second cam means, as applies, and the center of the opposite cam follower associated therewith; and
$\angle A$ = any specified angle on the first or second cam means, as applies, from 0° to 360°.

2. The apparatus of claim 1 wherein said translating means comprises an X-Y table means.

3. The apparatus of claim 2 wherein $Z_{\angle A}$ of the first cam means equals $Z_{\angle A}$ of the second cam means.

4. The apparatus of claim 2 wherein the first and second cam means comprise a single cam which commonly operates said first and second pairs of cam followers.

5. The apparatus of claim 1 wherein said first and second cam means are described, in addition, by the equation:

$d1$/degree of rotation of the cam means = a constant wherein:
$d1$ = the vector movement about said path.

6. The apparatus of claim 1 wherein said center of revolution is generally near the dynamic center of mass of the moving parts of said apparatus created responsive to rotation of said first and second cam means.

7. The apparatus of claim 6 wherein $Z_{\angle A}$ of the first cam means equals $Z_{\angle A}$ of the second cam means.

8. The apparatus of claim 1 wherein said center of revolution is substantially adjacent to or within the path described by the moving dynamic center of mass of the moving parts of said apparatus created responsive to rotation of said first and second cam means.

9. Apparatus for repeatedly describing a certain path and comprising a rotatable cam means, a first pair of cam followers spaced a fixed distance apart and disposed on opposite sides of and in alignment with the center of revolution of the cam means to define a first axis, a second pair of cam followers spaced a fixed distance apart and disposed along a second axis which extends normal to said first axis, said second axis passing through said center of revolution which is disposed intermediate the second pair of cam followers, said cam means being cooperable with said cam followers to supply positive driven motion in the four directions defined by said first and second axis responsive to the rotation of said cam means, means to translate the motions along said first and second axis into the vector sum thereof, said cam means being described by the equation:

$$Z_{\angle A} + Z'_{\angle A + 180°} = \text{a constant}$$

wherein:
$Z$ = the distance between said center of revolution and the center of a cam follower;
$Z'$ = the distance between said center of revolution and the center of the opposite cam follower; and
$\angle A$ = any specified angle on the cam means from 0° to 360°.

10. The apparatus of claim 9 including means to drive said cam means at an essentially constant angular velocity.

11. The apparatus of claim 10 wherein said translating means comprises an X-Y table means.

12. The apparatus of claim 11 wherein said cam means is described, in addition, by the equation:

$d1$/degree of rotation of the cam means = a constant
wherein:
$d1$ = the vector movement about said path.

13. The apparatus of claim 12 wherein the center of revolution of the cam means is generally near the dynamic center of mass of the moving parts of said apparatus created responsive to rotation of said first and second cam means.

* * * * *

PO-1050
(5/69)

UNITED STATES PATENT OFFICE
CERTIFICATE OF CORRECTION

Patent No. 3,818,769          Dated June 25, 1974

Inventor(s) Ruben A. Tigner et al

It is certified that error appears in the above-identified patent and that said Letters Patent are hereby corrected as shown below:

On the first page of the patent, under "Abstract", tenth line down, remove the number "76" and insert the word --platform-- before the number "35".

In the same paragraph, 15th line down, change the word "whcih" to --which--.

Column 4, line 55, remove the word "four" which appears before "nozzle".

Signed and sealed this 5th day of November 1974.

(SEAL)
Attest:

McCOY M. GIBSON JR.          C. MARSHALL DANN
Attesting Officer            Commissioner of Patents